US 6,710,975 B2

(12) United States Patent
Sato et al.

(10) Patent No.: US 6,710,975 B2
(45) Date of Patent: Mar. 23, 2004

(54) MAGNETIC HEAD AND READ/WRITE APPARATUS HAVING REDUCED STRESS IN A SLIDER AND SUPPORTER

(75) Inventors: Hidezi Sato, Niigata-ken (JP); Mitsuru Watanabe, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 86 days.

(21) Appl. No.: 09/879,073

(22) Filed: Jun. 11, 2001

(65) Prior Publication Data
US 2001/0050832 A1 Dec. 13, 2001

(30) Foreign Application Priority Data

Jun. 12, 2000 (JP) ......................................... 2000-175380

(51) Int. Cl.$^7$ ................................................ G11B 5/60
(52) U.S. Cl. .................................................... 360/234.6
(58) Field of Search ........................... 360/234.6, 234.5, 360/323

(56) References Cited

U.S. PATENT DOCUMENTS

| 5,321,568 A | * | 6/1994 | Hatam-Tabrizi | ......... 360/245.1 |
| 5,438,223 A | * | 8/1995 | Higashi et al. | ............. 257/774 |
| 5,696,652 A | | 12/1997 | Satoh | |
| 5,732,459 A | * | 3/1998 | Shiraishi et al. | ......... 29/603.06 |
| 5,734,523 A | * | 3/1998 | Scheidecker et al. | .... 360/234.5 |
| 6,036,813 A | * | 3/2000 | Schulz et al. | ............ 156/307.7 |
| 2001/0048573 A1 | * | 12/2001 | Kawai et al. | ............ 360/234.5 |
| 2003/0142444 A1 | * | 7/2003 | Tan et al. | ................ 360/234.6 |

FOREIGN PATENT DOCUMENTS

| JP | 02089212 A | * | 3/1990 | ............ G11B/5/60 |
| JP | 02244419 A | * | 9/1990 | ............ G11B/5/60 |
| JP | 03230315 A | * | 10/1991 | ............ G11B/5/60 |
| JP | 08188760 A | * | 7/1996 | .............. C09J/9/02 |
| JP | 09022518 A | * | 1/1997 | ............ G11B/5/60 |
| JP | 09306234 A | * | 11/1997 | ............ H01B/1/20 |
| JP | 11120531 A | * | 4/1999 | ............ G11B/5/60 |
| JP | 11185232 A | * | 7/1999 | ............ G11B/5/60 |
| JP | 11185417 A | * | 7/1999 | ............ G11B/21/21 |
| JP | 11-232811 | | 8/1999 | |
| JP | 11259841 A | * | 9/1999 | ............ G11B/5/60 |
| JP | 11283346 A | * | 10/1999 | ............ G11B/21/21 |

* cited by examiner

*Primary Examiner*—William Klimowicz
(74) *Attorney, Agent, or Firm*—Brinks Hofer Gilson & Lione

(57) ABSTRACT

A magnetic head includes an adhesive layer having particulate disposed between a slider and a flexure. A gap of a predetermined size is disposed between the slider and the flexure. Stress generated by the thermal expansion of the slider and the flexure are absorbed or substantially prevented by the adhesive layer.

23 Claims, 3 Drawing Sheets

MAGNETIC HEAD AND READ/WRITE APPARATUS HAVING REDUCED STRESS IN A SLIDER AND SUPPORTER

BACKGROUND

The present invention relates to a process that reduces or compensates for stress between a slider and a supporter within a magnetic head assembly.

FIG. 4 illustrates a partial side view of a magnetic head within a hard disk drive. The magnetic head includes a slider 1 and a supporter 2. The slider 1 is made of a ceramic material that includes a magnetic element 4 positioned near a trailing edge B. The magnetic element 4 includes an MR head (read head) and an inductive head (write head). The MR head detects a leakage magnetic field from a hard disk by detecting a magnetoresistive effect. The inductive head includes a coil. The supporter 2 includes a load beam 5 and a flexure 6. The load beam 5 is made of a leaf springs material such as stainless steel and includes a hemispherical pivot 7. The hemispherical pivot 7 projects downward from the flexure 6 and biases the slider 1.

The flexure 6 is constructed of a thin leaf spring material such as stainless steel. The flexure 6 includes a fixed portion 6a and a tongue piece 6b. The slider 1 is fixed to the bottom surface of the tongue piece 6b by an adhesive layer 20. The top surface of the tongue piece 6b is pressed against the pivot 7. The slider 1 is attached to the bottom surface of the tongue piece 6b. Due to the elasticity of the tongue piece 6b, the slider 1 can change positions relative to the pivot 7.

The slider 1 is pressed toward a disk D by the elastic force produced by the load beam 5. The magnetic head is generally used in a hard disk drive of a contact start and stop (CSS) type. When the disk D is stationary, an ABS surface 1a of the slider 1 comes into contact with a recording surface of the disk D due to the elastic force generated by the load beam 5. When the disk D rotates, air flows between the slider 1 and the surface of the disk D in a rotating direction of the disk D. Accordingly, the ABS surface 1a of the slider 1 is biased upward by the airflow, and the slider 1 is carried above the surface of the disk D at a height or a spacing of δ1.

As shown in FIG. 4, the slider 1 inclines. This inclination allows the leading edge A to be positioned at a higher position than the trailing edge B relative to the disk D as the magnetic element 4 passes above the disk D. In this configuration, the MR head of the magnetic element 4 reads magnetic signals from the disk or the inductive head writes magnetic signals to the disk D.

As shown in FIG. 5, a gap separates the slider 1 from the tongue piece 6b of the flexure 6. The distance h1 between the slider 1 and the tongue piece 6b receives the adhesive layer 20. The adhesive layer 20 is made of a thermosetting resin. In an adhering process, the adhesive layer 20 is disposed between the slider 1 and the flexure 6. UV curing is performed on the combination to temporarily fix the slider 1 to the flexure 6. Heat treatment is then applied to cure the adhesive layer 20, which affixes the slider 1 to the flexure 6.

Since the slider 1 and the flexure 6 have different coefficients of thermal expansion, there can be problems affixing the slider 1 to the flexure 6 by a heat treatment. The slider 1 can deform as the slider 1 is secured to the tongue piece 6b. The amount of deformation that can occur is proportional to a difference between the coefficients of thermal expansion of the slider 1 and the flexure 6, and is also proportional to a difference between the heat curing temperature and the room temperature.

In FIG. 5, the coefficient of thermal expansion of the flexure 6 is larger than that of the slider 1. Thus, when the slider 1 deforms the ABS surface 1a warps outward. As the ABS surface 1a warps outward, the spacing h1 is reduced or lost which adversely affects the output of the magnetic element 4 as the disk D rotates.

In some conventional magnetic heads, the thickness of the adhesive layer 20 cannot be adjusted, and the distance h1 between the slider 1 and the flexure 6 is not large enough to adequately absorb the stress. When the distance h1 is small, the adhesive layer 20 cannot adequately absorb the stress, and the deformation of the slider 1 during the heat curing process of the adhesive layer 20 cannot be suppressed.

When the distance h1 is too large, it is difficult to position the slider 1 in a parallel position to the flexure 6, and the slider 1 tends to be fixed in an inclined position. In such instances, the slider 1 cannot always be placed in a predetermined position. Thus, a spacing loss occurs and the slider 1 can collide with the surface of the disk D.

In addition, in some conventional magnetic head devices, the thickness of the adhesive layer 20 is not uniform, and the surface 20a of the adhesive layer 20 tends to undulate. In such instances, it is difficult to adequately secure the slider 1 to the flexure 6 through the adhesive layer 20.

SUMMARY

Accordingly, presently preferred embodiments provide a magnetic head which is substantially free of the above-described problems. More specifically, the presently preferred embodiments provide a magnetic head in which an adhesive layer is disposed between the slider and the supporter. A gap or clearance of adequate size is maintained to reduce or compensate for the stress generated by different coefficients of thermal expansion of the slider and the supporter. In addition, the presently preferred embodiments provide a read and/or write apparatus having a magnetic head.

According to an aspect of the invention, a magnetic head includes a slider, a supporter, and an adhesive. The slider includes a magnetic element used for reading and/or writing. Preferably, the supporter has a different thermal expansion coefficient than the thermal expansion coefficient of the slider. An adhesive layer is disposed between the slider and the supporter. The adhesive layer includes particulate matter or components. The slider and the supporter are secured to each other by the adhesive layer. The particulate components preferably create a gap between the slider and the supporter. According to one presently preferred embodiment, the gap or clearance between the slider and the supporter is defined by the size of the particulate components within the adhesive.

Preferably, the adhesive layer disposed between the slider and the supporter can adequately absorb or transfer the stress induced by the different thermal expansion coefficients of the slider and the supporter. Thus, deformation of the slider during a heat curing process can be substantially reduced.

Since the particulate components are preferably mixed in the adhesive layer, an adhesive layer having uniform thickness can be used. Accordingly, a flat surface of the adhesive layer is easily created, and the slider is secured in a substantially parallel position to the supporter by the adhesive layer. Preferably, the size of the gap positioned between the slider and the supporter is within a range of about 20 to about 30 μm. When the gap is smaller than about 20 μm, the stress generated during the heat curing process by the thermal expansions of the slider and the supporter cannot always be adequately absorbed. When the gap is larger than about 30 μm, it can be difficult to secure the slider in a substantially parallel position to the supporter.

In addition, some of the particulate components preferably have a cross-sectional size of about 20 to about 30 μm in an area in which the slider and the supporter oppose each other. Accordingly, the height of the gap or distance between the slider and the supporter is preferably within the range of about 20 to about 30 μm. In addition, some of the particulate components having a cross-sectional height or thickness of about 20 to about 30 μm are preferably contained in the adhesive layer at about 5% weight to about 20% weight.

In addition, a Type D durometer hardness of the adhesive layer after heat curing is preferably within a range of about 50D to about 70D. The adhesive layer preferably has an adequate hardness. When the adhesive layer is too soft, it is difficult to secure the slider in a parallel position to the supporter. When the adhesive layer is too hard, the stress generated during the heat curing process by the thermal expansion of the slider and the supporter cannot always be adequately be absorbed.

The particulate components preferably include an inorganic filler and/or an organic filler. The inorganic or organic fillers also called as spacers, or a combination of inorganic and organic filler can comprise commercial fillers. In addition, at least the surfaces of some of the particulate components are preferably conductive. When such conductive particulate components are contained in the adhesive layer, the slider and the supporter are electrically coupled to each other. Accordingly, static or accumulated charges on the slider may be discharged to ground through the supporter.

In addition, the particulate materials or components are preferably comprised of a conductive metal. Alternatively, the particulate components can be comprised of an insulator, and surfaces of these particulate components can be conductive. The particulate components are preferably contained within the adhesive layer, which is disposed between the slider and the flexure. Thus, the gap or clearance having the predetermined size is positioned between the slider and the flexure, and the stress generated by the thermal expansion of the slider and the flexure may be adequately absorbed or transferred by the adhesive layer. Accordingly, the deformation of the slider may be controlled or preferably prevented in comparison to some conventional assemblies. In addition, the flat surface of the adhesive layer may be adequately formed, and the slider may be secured in a substantially parallel position to the flexure. Thus, spacing losses that can occur when the disk is driven can be reduced and a stable output can be obtained.

According to another aspect, a magnetic head comprises a slider having a magnetic element that reads and/or writes to a disk. Preferably, a supporter has a different coefficient of thermal expansion than the coefficient of thermal expansion of the slider. An adhesive layer is disposed between the slider and the supporter. A gap within a range of about 20 to about 30 μm is provided between the slider and the supporter. The adhesive layer positioned within the gap is preferably comprised of an adhesive having a Type D durometer hardness after curing within a range of about 50D to about 70D.

In another aspect, preferably the particulate components are not mixed in the adhesive. However, the Type D durometer hardness of the adhesive layer after curing and the size of the gap between the slider and the supporter are within predetermined ranges. The stress that is generated during the heat curing by the thermal expansion of the slider and the supporter is preferably reduced by selecting a compensating adhesive. Accordingly, deformation of the slider may be controlled or substantially compensated by the adhesive.

When the distance between the slider and the flexure is within the range of about 20 to about 30 μgm and the Type D durometer hardness of the adhesive layer after curing is within the range of about 50D to about 70D, the particulate components need not be contained in an adhesive layer. In this presently preferred embodiment, the gap or clearance between the slider and the flexure can adequately absorb the stress generated by the difference in thermal expansion coefficients between the slider and the flexure. Accordingly, deformation of the slider is substantially reduced, and a flat adhesive surface is formed. In addition, the slider may be fixed in a substantially parallel position to the flexure. Thus, spacing losses that can occur when the disk is driven can be reduced and a stable output can be obtained.

A magnetic read and/or write apparatus according to another presently preferred embodiment comprises a rotating unit, a head, and a drive device. Preferably, the rotating unit comprises a structure that moves across a recording medium. The driving device or driving means moves the magnetic head across the recording medium.

An adequately dimensioned gap is preferably created by the adhesive layer disposed between the slider and the supporter. The stress caused by the differences in thermal expansion coefficients of the slider and the supporter is preferably absorbed by the adhesive layer. In addition, a flat adhesive surface layer may be formed, and the slider may be easily positioned substantially parallel to the supporter. Accordingly, the slider can be carried above or across the recording medium with a predetermined spacing between the slider which improves the writing and the reading process of the disk.

DESCRIPTION OF THE PRESENTLY PREFERRED EMBODIMENTS

Figure 2:
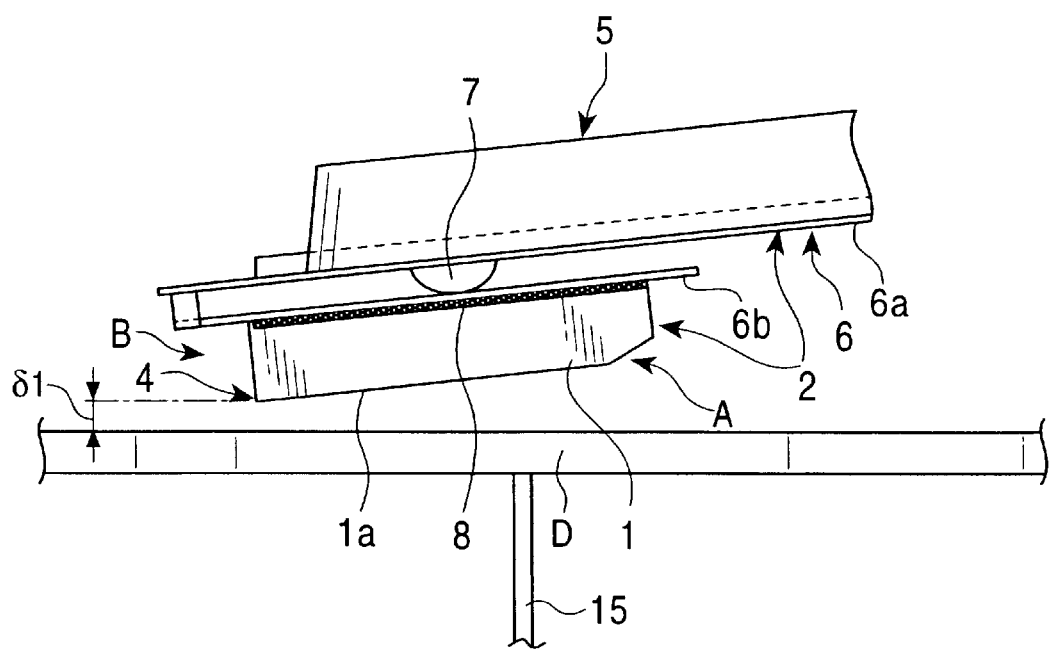
FIG. 2 is a partial side view of an end portion of the magnetic head according to the embodiment of FIG. 1.
Figure 3:
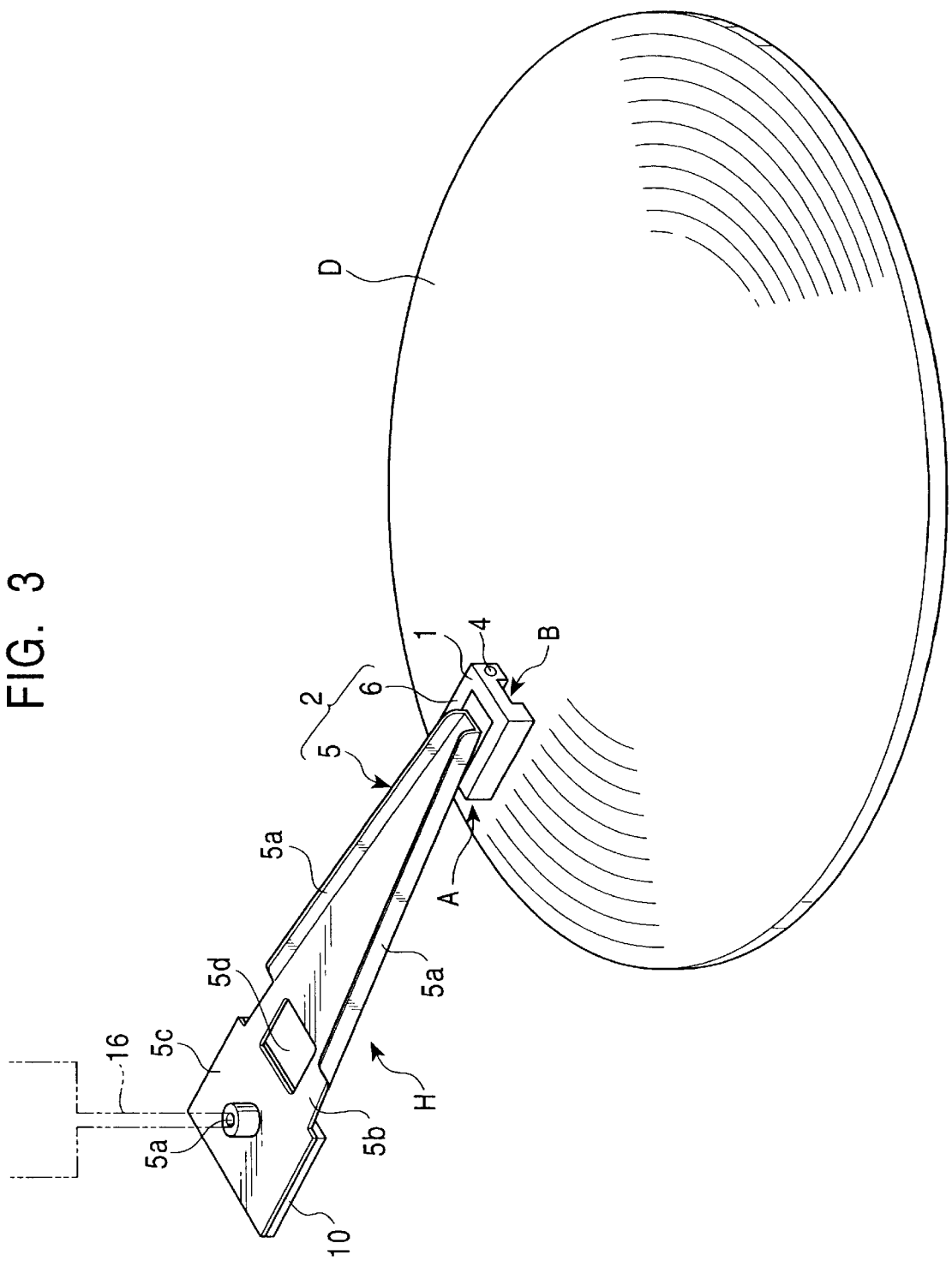
FIG. 3 is a perspective view of the magnetic head according to the embodiment of FIG. 1.
Figure 4:
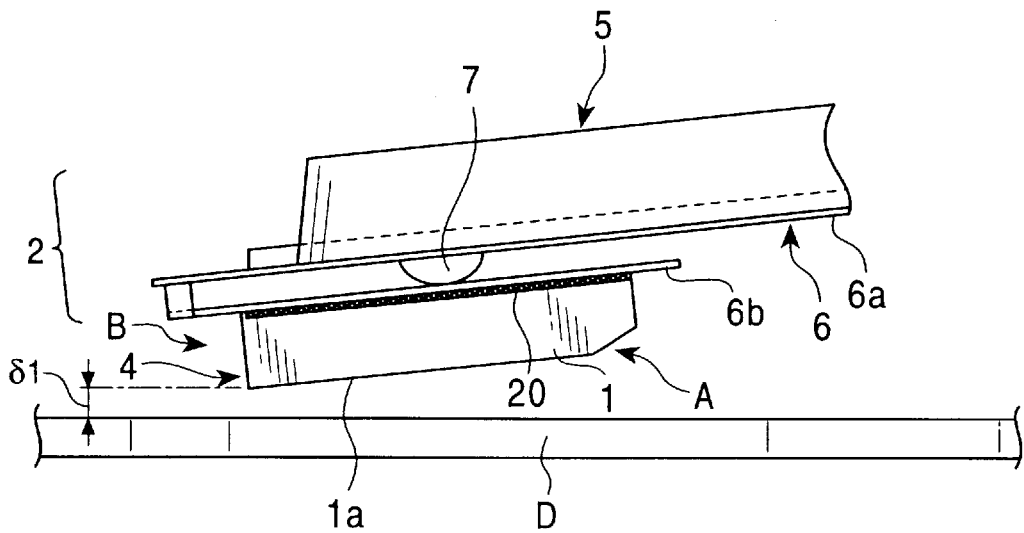
FIG. 4 is a side view of an end position of a conventional magnetic head.
Figure 5:
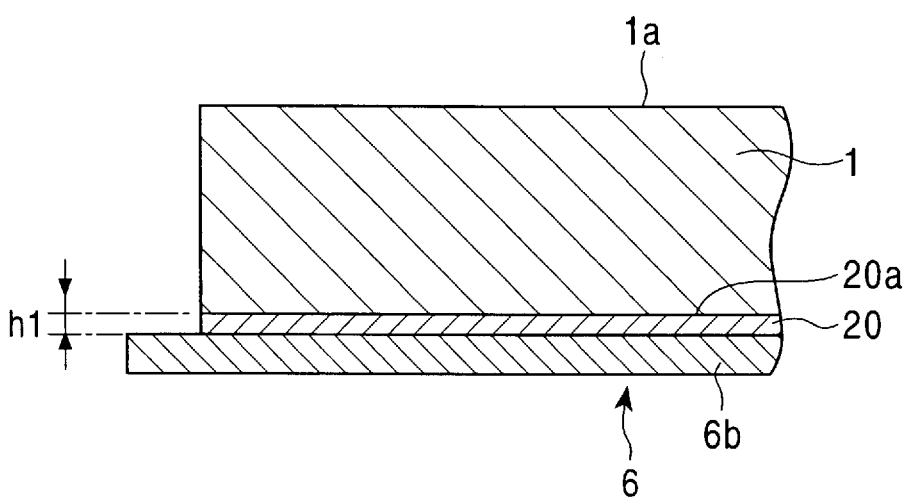
FIG. 5 is an enlarged view of a position of the magnetic head of FIG. 4 illustrating a slider secured to a flexure.

Referring to FIGS. 2 and 3, preferably a magnetic head H is coupled to a magnetic read and/or write apparatus as shown in FIG. 3. Preferably, the magnetic read and/or write apparatus includes a rotating unit 15 for driving a recording medium and a driving unit 16 that moves the magnetic head H across the moving medium. As shown in FIG. 3, the magnetic head H includes a slider 1 and a supporter 2. Preferably, the supporter 2 is coupled to the slider 1 and preferably the slider 1 is comprised of a ceramic material that includes a magnetic element 4 positioned on a side surface near a trailing edge B.

Preferably, the magnetic element 4 is comprised of thin films formed by a sputtering technique, and includes an MR head, a read head, and an inductive head, a write head. Preferably, the MR head includes a magnetoresistive element, such as a GMR element that can be a spin valve film, an AMR element, etc. The magnetic element 4 can comprise a read head, an inductive head, or a combination of a read and a write head.

The supporter 2 comprises a load beam 5 and a flexure 6. Preferably, the load beam 5 is comprised of a leaf springs material, such as stainless steel and includes rigid bent portions 5a projecting away from a disk D at two spaced apart sides. In addition, the load beam 5 comprises leaf spring portions 5b that do not have bent side portions. The substantially planar portions of the leaf spring portions 5b are positioned near a first end of the load beam 5 opposite a second end or a tip. Preferably, the slider 1 is elastically supported above a disk D by the elastic force of the leaf spring portions 5b.

As shown in FIG. 3, the load beam 5 includes a mounting portion 5c positioned near the first end, and a mounting member 10 fixed to a bottom surface at the mounting portion 5c. In addition, the mounting portion 5c includes a through hole 5d that is configured to secure the mounting portion 5c to a driving unit 16, such as a hard disk drive driving unit partially shown in FIG. 3. Preferably, the slider 1 is moved across the disk D by the driving unit 16. In a preferred embodiment, the magnetic head H is integrated within or is a unitary part of a contact start and stop (CSS) type hard disk drive.

Referring to FIG. 2, when the disk D is stationary, an ABS surface or lift surface 1a of the slider 1 makes contact with the recording surface of the disk D due to an elastic force. When the rotating unit 15 begins to rotate the disk D, air flows between the slider 1 and the surface of the disk D in a rotating direction. The ABS surface 1a of the slider 1 is biased upward by the airflow. The slider 1 is supported above the surface of the disk D at a height or spacing of $\delta 1$.

Referring to FIG. 2, the flexure 6 includes a fixed portion 6a and a tongue piece 6b. Preferably, the slider 1 is secured to a bottom surface of the tongue piece 6b by an adhesive 11 or an adhesive layer 8. The load beam 5 includes a hemispherical pivot 7 which projects downward from the load beam 5 and abuts the tongue piece 6b. The slider 1 is supported by an assembly that allows the slider 1 to change position through the hemispherical pivot 7 relative to the disk D.

Figure 1:
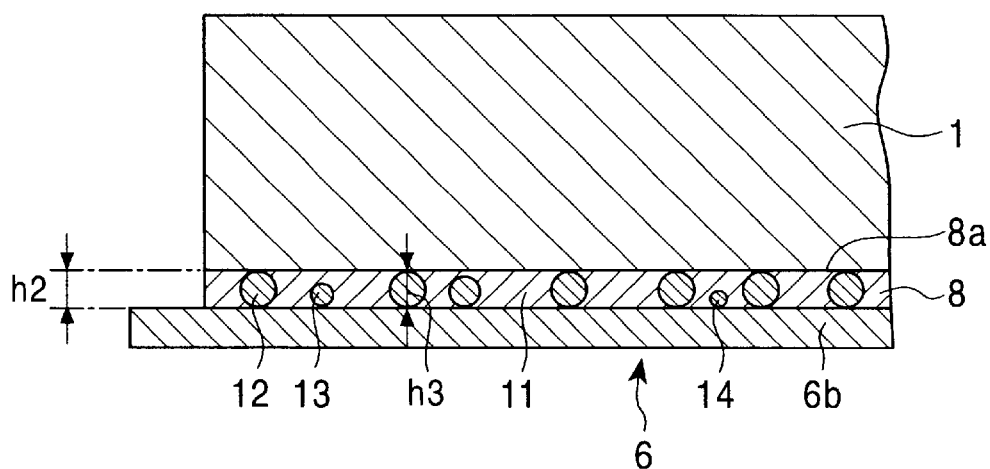
FIG. 1 is an enlarged view of a portion of a magnetic head according to a first embodiment.

Preferably, the slider 1 is secured to the tongue piece 6b of the flexure 6 by the adhesive layer 8. In this presently preferred embodiment, the adhesive layer 8 includes particulate components 12 intermixed within the adhesive 11. As shown in FIG. 1, the particulate components 12 within the adhesive layer 8 may include fillers or spacers. Preferably the fillers are spherical, although any other shape can also be used. For example, rod-shaped fillers, ellipsoidal fillers, etc., can be used in alternative preferred embodiments.

The adhesive 11 is preferably comprised of a thermosetting resin of an epoxy type material. However, the adhesive 11 may also comprise a thermoplastic resin such as a thermoplastic resin of acrylic type, polyurethane type, polyester type, nylon type, etc. The above-described fillers can be organic and/or inorganic materials.

The inorganic fillers can comprise silver and/or silica gel, and the organic fillers can comprise polyester, polystyrene beads, or any other material that is a macromolecular material. In the presently preferred embodiments, commercially available organic or inorganic fillers can be used. In addition, the hardness of the fillers can be any value, and can be arbitrarily chosen. Preferably, the Type D durometer hardness of the fillers is within a range of about 50D to about 70D. In addition, since ultraviolet UV curing is performed before the heat treatment of the adhesive layer 8, preferably, the fillers can absorb ultraviolet rays.

Preferably, at least the surfaces of some of the particulate components 12 are electrically conductive. When such conductive particulate components 12 are intermixed within the adhesive 11, the slider 1 is electrically coupled to the flexure 6 and preferably static electricity, accumulated charges, or peripheral charges stored on the slider 1 can be discharged or drawn to electrical ground through the supporter 2.

In the presently preferred embodiments using silver inorganic fillers, the entire particulate components 12 are comprised of a conductive material. In other presently preferred embodiments, however, the particulate components 12 may include particulate components 12 having conductive surfaces that surround non-conductive materials. In one preferred embodiment, the insulating organic fillers may be plated with a conductive material such as a metal.

In the presently preferred embodiment, the adhesive layer 8 is disposed between the slider 1 and the flexure 6. Preferably, the adhesive layer 8 contains the adhesive 11 intermixed with particulate components 12. In this preferred embodiment, the distance h2 between the slider 1 and the flexure 6 can vary with the cross-sectional size or height of the particulate components 12 in an area in which the slider 1 and the flexure 6 oppose or are positioned across from each other. More specifically, referring to FIG. 1, the distance h2 increases with the cross-sectional diameter, area, or height of the particulate components 12. The distance h2 is disposed within an area in which the slider 1 and the flexure 6 oppose each other. As shown, the distance h2 can be defined by the largest cross-sectional diameter, area or height of the particulate components 12 and 13.

According to the presently preferred embodiment, the adhesive layer 8 provides a gap or clearance that is large enough to sufficiently reduce or absorb stress. The stress can be induced by many means including the difference in thermal expansion coefficients between the slider 1 and the flexure 6 during a heating process such as a heat curing process.

Since the particulate components 12 are intermixed with the adhesive 11, the gap having predetermined size h2 is reliably provided and a flat surface 8a of the adhesive layer 8 can be easily formed. Thus, the slider 1 can adequately adhere to the surface 8a of the adhesive layer 8 in a substantially parallel position to a bottom or a top surface of the flexure 6.

The distance h2 between the slider 1 and the flexure 6 is preferably within the range of about 20 to about 30 $\mu$m in the presently preferred embodiment. When the distance h2 is smaller than about 20 $\mu$m, the adhesive layer 8 may not adequately absorb the stress generated during the heat curing process of the adhesive layer 8. When the distance h2 is larger than about 30 $\mu$m, it can be difficult to maintain a flat adhesive surface 8a. Consequently, the slider 1 may not be adequately secured to the flexure 6 outside of the presently preferred ranges. Accordingly, in the presently preferred embodiment, the distance h2 between the slider 1 and the flexure 6 is preferably within a range of about 20 to about 30 $\mu$m.

As described-above, the distance h2 can be determined by the cross-sectional size, height, or diameter h3 of the particulate components 12 in the area partially disposed between the slider 1 and the flexure 6. Thus, to adjust the distance h2 within the range of about 20 to about 30 $\mu$m, preferably the diameter h3 of the particulate components 12 in the opposing direction of the slider 1 and the flexure 6 is preferably within the range of about 20 to about 30 μm.

As shown in FIG. 1, the adhesive layer 8 may include particulate components 13 and 14 which have a cross-sectional heights or diameters of less than about 20 μm in between the slider 1 and the flexure 6. In the presently preferred embodiment, the particulate components within the range of about 20 to about 30 μm are preferably comprised within the adhesive layer 8 at about 5% weight to about 20% weight. Accordingly, the distance h2 between the slider 1 and the flexure 6 is attained in the range of about 20 to about 30 μm, and a flat adhesive layer surface 8a is formed. Preferably, the Type-D durometer hardness of the adhesive layer 8 after curing is within the range of about 50D to about 70D.

Preferably, the durometer is a hardness measurement. In the presently preferred embodiments, the durometer is defined according to the Japanese Industrial Standard (JIS) K 6253. Under this standard, the hardness preferably is measured by a testing machine (durometer) which measures the hardness of a specimen by pressing a spine having a predetermined shape against the specimen to form a concavity, and by measuring the depth of the concavity. With respect to Type D durometer hardness, the Japanese Industrial Standard (JIS) K 6253 describes the measuring range of Type D durometer hardness is more than A90 in terms of Type A durometer hardness. If the hardness is lower than D20, Type A durometer is used for the measurement. In addition, with respect to Type A durometer hardness, the Japanese Industrial Standard (JIS) K 6253 describes the measuring range of Type A durometer hardness is A10 to A90. If the hardness is more than A90, the hardness is measured in terms of Type D durometer hardness, and if the hardness is less than A20, Type-E durometer is used for the measurement. With respect to the preferred embodiments, measurements of durometer hardness are based on the Japanese Industrial Standard (JIS) K 6253.

According to the presently preferred embodiments, Type D durometer hardness of the adhesive layer 8 after curing is within the range of about 50D to about 70D. Accordingly, the adhesive layer 8 can adequately absorb the stress generated during the heat curing process caused by the thermal expansions of the slider 1 and the flexure 6. In addition, the thickness h2 of the adhesive layer 8 can be about 20 to about 30 μm. As a result of the selected thickness of the adhesive 11, a substantially flat adhesive surface 8a is formed.

In the presently preferred embodiment, the above-described Type D durometer hardness of the adhesive layer 8 can depend on the hardness of the adhesive 11 and also on the content of the particulate components 12. More specifically, the Type D durometer hardness may be increased by increasing the content of the particulate components 12, 13 and 14 and the hardness may be reduced by reducing the content of the particulate component 12, 13 and 14. Thus, the Type D durometer hardness may be within the range of about 50D to about 70D by adjusting the content by a percentage of weight of the particulate components 12, 13, and 14. In addition, in the presently preferred embodiment the adhesive layer 8 may comprise particulate components made of a rubber material, elastic materials, etc.

Preferably, the particulate components 12 contained within the adhesive layer 8 are uniformly dispersed across the tongue piece 6b. In the presently preferred embodiment, common wet-mode methods using a sprayer or dry-mode methods with airflow can be used.

Preferably, the adhesive 11 is applied after the particulate components 12 are uniformly dispersed across the tongue piece 6b. Thus, the adhesive layer 8 having a uniform thickness is formed, and the distance h2 between the slider 1 and the flexure 6 is easily controlled within the predetermined ranges. In one presently preferred alternative embodiments, it is not necessary for the particulate components 12 to be contained or intermixed within the adhesive layer 8. The adhesive layer 8 may consist solely of the adhesive 11. In this presently preferred alternative embodiment, the distance h2 between the slider 1 and the flexure 6 is within the range of about 20 to about 30 μm, and the Type D durometer hardness of the adhesive layer 8 after curing is within the range of about 50D to about 70D.

To obtain the predetermined distance h2 and hardness of the adhesive layer 8 in the above-described ranges, a sufficient volume of adhesive 11 is used. When an adhesive of an acrylic or epoxy type is used, the distance h2 may be within the range of about 20 to about 30 μm, and the Type D durometer hardness of the adhesive layer 8 after curing may be within a range of about 50D to about 70D. By forming the adhesive layer 8 having a thickness h2 and hardness within these ranges, the stress caused by the different thermal expansion coefficients between the slider 1 and the flexure 6 is adequately absorbed by the adhesive layer 8. Moreover, the slider 1 may be fixed in a position substantially parallel to the flexure 6.

As described, the adhesive layer 8 that is disposed between the slider 1 and the flexure 6 may contain particulate components. Thus, the gap or clearance of the predetermined size h2 is provided between the slider 1 and the flexure 6. The stress caused by the thermal expansion of the slider 1 and the flexure 6 may be adequately absorbed. Accordingly, compared to some conventional type magnetic head assemblies, deformation of the slider 1 may be substantially reduced or prevented when the magnetic heads are assembled. In addition, a controlled adhesive surface 8a may be formed, and the slider 1 may be positioned substantially parallel to the flexure 6 or to an upper or lower surface of the flexure 6.

Thus, according to the presently preferred embodiments, spacing losses which can occur while the disk is being driven may be reduced, and stable output signals may be obtained. In addition, according to one presently preferred alternative embodiments, the particulate components are not necessarily contained within the adhesive layer 8. As long as the distance h2 between the slider 1 and the flexure 6 is within the range of about 20 to about 30 μm and the Type D durometer hardness of the adhesive layer after curing is within the range of about 50D to about 70D, the stress caused by the different coefficients of thermal expansion between the slider 1 and the flexure 6 can be adequately absorbed. Accordingly, deformation of the slider 1 is absorbed or suppressed, and the flat surface 8a of the adhesive layer 8 is formed. In addition, the slider 1 can be positioned substantially parallel to the flexure 6. Thus, spacing losses that can occur when the disk D is driven, can be reduced and stable output can be obtained.

The magnetic head shown in FIGS. 1 to 3 and a magnetic read and/or write apparatus containing the magnetic head are preferably coupled to a hard disk drive. The preferred embodiments, however, may also interface other magnetic heads and magnetic read and/or apparatuses. Moreover, the magnetic head may be installed within a magneto-optic disk drive. In one presently preferred embodiment, the magnetic element 4 coupled to the slider 1 for reading and/or writing can be made using a sputtering technique. Preferably, the magnetic element is made of a bulk material.

In addition, the flexure 6 can be elastically deformed, and preferably the slider 1 and the flexure 6 are coupled by the adhesive layer 8. Other embodiments can also encompass the invention. For example, the flexure 6 may be a unitary part of or integral part of the load beam 5. The slider 1 may be coupled to the supporter 2 by a second adhesive layer disposed between the slider 1 and supporter 2. Moreover, in the preferred embodiment, the shapes, the materials, etc., of the supporter 2 are not limited to the described or illustrated shapes and/or materials.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A magnetic head comprising:
    a slider having a magnetic element, said slider having a thermal expansion coefficient;
    a supporter having a thermal expansion coefficient different from said thermal expansion coefficient of said slider;
    an adhesive disposed between said slider and said supporter, said adhesive comprising particulate components; and
    said slider is coupled to said supporter by said adhesive and separated from said supporter by a distance substantially equal to a largest cross-sectional height of said particulate components,
    wherein a portion of the particulate components are in simultaneous contact with the slider and the supporter.

2. A magnetic head according to claim 1, wherein said adhesive is disposed in a gap positioned between said slider and said supporter.

3. A magnetic head according to claim 2, wherein said gap is about 20 to about 30 $\mu$m in height between said slider and said supporter.

4. A magnetic head according to claim 3, wherein a portion of said particulate components have a thickness of about 20 to about 30 $\mu$m in an area in which said slider and said supporter oppose each other.

5. A magnetic head according to claim 1, wherein a portion of said particulate components having a thickness of about 20 to 30 $\mu$m are intermixed in said adhesive with about 5% weight to about 20% weight.

6. A magnetic head according to claim 1, wherein said particulate components comprise inorganic fillers.

7. A magnetic head according to claim 1, wherein said particulate components comprise organic fillers.

8. A magnetic head according to claim 1, wherein at least surfaces of a portion of said particulate components are conductive.

9. A magnetic head according to claim 8, wherein a portion of said particulate components comprise a conductive metal.

10. A magnetic head according to claim 8, wherein said particulate components comprise insulators having conductive surfaces.

11. A magnetic head according to claim 10, further comprising:
    a rotating unit configured to rotate a recording medium; and
    driving means for moving said magnetic head across said recording medium, wherein said magnetic head is positioned across from said recording medium.

12. A magnetic head according to claim 8, further comprising:
    a rotating unit configured to rotate a recording medium; and
    driving means for moving said magnetic head across said recording medium, wherein said magnetic head opposes said recording medium.

13. A magnetic head comprising:
    a slider having a magnetic head element, said slider having a thermal expansion coefficient;
    a supporter having a thermal expansion coefficient different from said thermal expansion coefficient of said slider;
    an adhesive disposed between said slider and said supporter, said adhesive comprising particulate components; and
    said slider is coupled to said supporter by said adhesive,
    wherein a Type D durometer hardness of said adhesive is about 50D to about 70D.

14. A magnetic head according to claim 13, further comprising:
    a rotating unit configured to rotate a recording medium; and driving means for moving said magnetic head across said recording medium, wherein said magnetic head opposes said recording medium.

15. A magnetic head according to claim 13, wherein a portion of said particulate components having a thickness of about 20 to about 30 $\mu$m are intermixed in said adhesive at about 5% weight to about 20% weight.

16. A magnetic head comprising:
    a magnetic element;
    a slider coupled to said magnetic element;
    a supporter having a thermal expansion coefficient different from a thermal expansion coefficient of said slider; and
    an adhesive disposed between said slider and said supporter,
    wherein a gap within a range of about 20 to about 30 $\mu$m is positioned between said slider and said supporter, wherein said adhesive has durometer hardness after a curing of about 50D to about 70D.

17. A magnetic head according to claim 16, further comprising:
    a rotating unit configured to rotate a recording medium; and
    driving means for moving said magnetic head across said recording medium, wherein said magnetic head opposes said recording medium.

18. A method of assembling a magnetic head comprising:
    coupling a magnetic element to a slider, said slider having a thermal expansion coefficient; and
    disposing an adhesive between said slider and a supporter, said supporter having a thermal expansion coefficient different from said thermal expansion coefficient of said slider, wherein said adhesive comprises particulate components and the distance between said slider and said supporter is substantially equal to the largest cross-sectional height of said particulate components, and a portion of the particulate components are in simultaneous contact with the slider and the supporter.

19. The method of claim 18 further comprising intermixing conducting particulate components within said adhesive.

20. The method of claim 18 further comprising positioning a rotating unit apart from said magnetic head and coupling a driving unit to said magnetic head, said driving unit configured to move said magnetic head across said recording medium.

21. A magnetic head comprising:
   a slider having a magnetic element, said slider having a thermal expansion coefficient;
   a supporter having a thermal expansion coefficient different from said thermal expansion coefficient of said slider;
   an adhesive disposed between said slider and said supporter, said adhesive comprising particulate components; and
   said slider is coupled to said supporter by said adhesive and separated from said supporter by a distance substantially equal to a largest cross-sectional height of particulate components;
   a portion of said particulate components having a thickness of about 20 to 30 $\mu$m are intermixed in said adhesive with about 5% weight to about 20% weight,
   wherein a Type D durometer hardness of said adhesive layer is about 50D to about 70D.

22. A magnetic head according to claim 21, further comprising:
   a rotating unit configured to rotate a recording medium; and
   driving means for moving said magnetic head across said recording medium, wherein said magnetic head opposes said recording medium.

23. A magnetic head comprising:
   a slider having a magnetic element, said slider having a thermal expansion coefficient;
   a supporter having a thermal expansion coefficient different from said thermal expansion coefficient of said slider;
   an adhesive disposed between said slider and said supporter, said adhesive comprising particulate components; and
   said slider is coupled to said supporter by said adhesive and separated from said supporter by a distance substantially equal to a largest cross-sectional height of particulate components;
   wherein a Type D durometer hardness of said adhesive layer is about 50D to about 70D.

* * * * *